Figure 3:
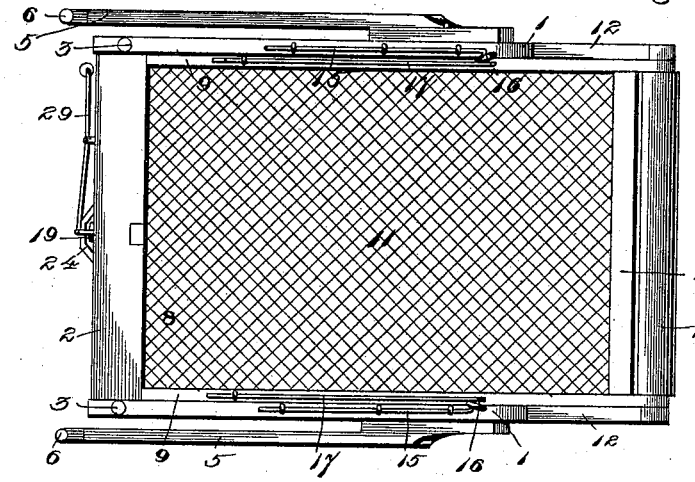

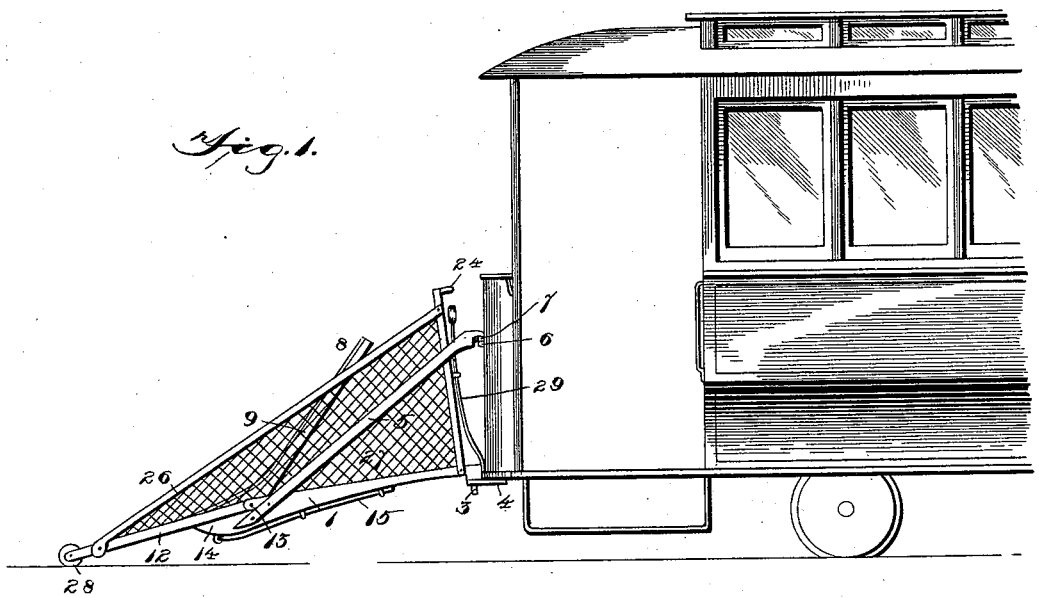

(No Model.) 2 Sheets—Sheet 2.

J. WICK.
CAR FENDER.

No. 588,847. Patented Aug. 24, 1897.

WITNESSES
T. L. Mockabee
Henry H. Byrne

INVENTOR
John Wick.
by John Wedderburn
Attorney

UNITED STATES PATENT OFFICE.

JOHN WICK, OF SOUTH CHESTER, PENNSYLVANIA, ASSIGNOR OF ONE-HALF TO JESSE LANE, OF SAME PLACE.

CAR-FENDER.

SPECIFICATION forming part of Letters Patent No. 588,847, dated August 24, 1897.

Application filed December 17, 1896. Serial No. 616,061. (No model.)

*To all whom it may concern:*

Be it known that I, JOHN WICK, a citizen of the United States, residing at South Chester, in the county of Delaware and State of Pennsylvania, have invented certain new and useful Improvements in Car-Fenders; and I do hereby declare the following to be a full, clear, and exact description of the invention, such as will enable others skilled in the art to which it appertains to make and use the same.

This invention relates to car-fenders, and has for its object to provide a device of the character referred to which may be readily applied to either end of a car and detached therefrom, the said fender running close to the road-bed, so as to insure the picking up of an object or person on the track, and also having provision whereby in the picking up of such an object or person the scoop-frame will be folded or thrown back by the weight of such object and locked in its folded position, thus preventing the front end of the scoop-frame from sagging under the weight placed thereon and coming into contact with the road-bed so as to injure the same.

The invention consists in an improved car-fender embodying certain novel features and details of construction and arrangement of parts, as hereinafter fully described, illustrated in the drawings, and pointed out in the claims.

Figure 4:
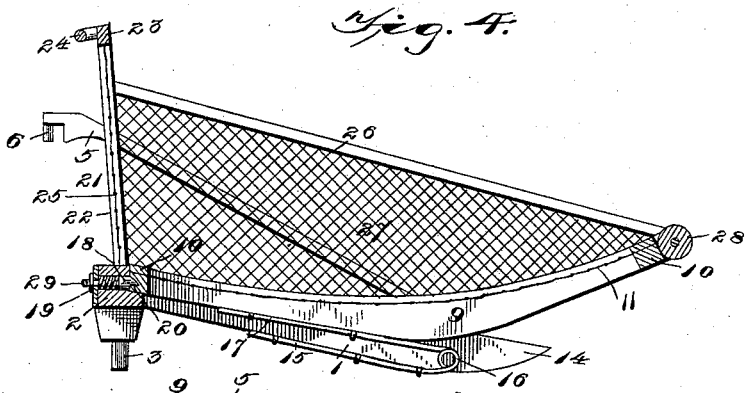
Figure 5:
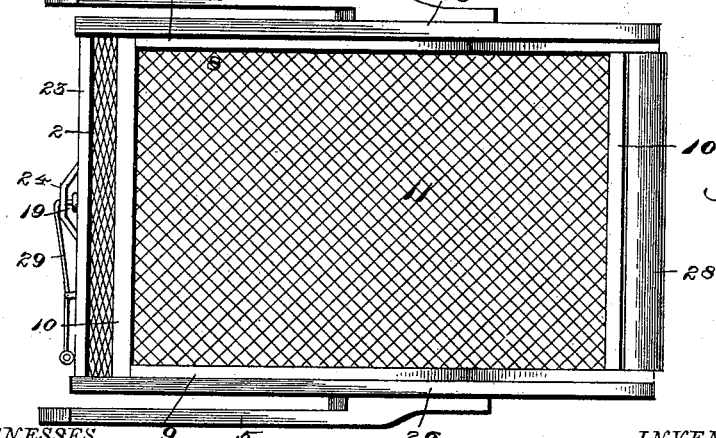

In the accompanying drawings, Figure 1 is a side elevation showing the improved car-fender applied to the end of a car and arranged in its operative position ready to pick up an object. Fig. 2 is a similar view showing the fender folded as it appears after having picked up an object. Fig. 3 is a bottom plan view of the fender detached. Fig. 4 is a vertical longitudinal section through the fender. Fig. 5 is a top plan view of the fender.

Similar numerals of reference designate corresponding parts in the several figures of the drawings.

The improved fender contemplated in this invention is intended to be detachably connected to the end of a car and preferably to the dashboard thereof. The fender comprises a supporting-frame consisting of the side parallel supporting-arms 1, connected at their rear ends to a cross-bar 2, having at its ends depending pins 3, adapted to enter the eyes in the forward ends of a pair of spaced brackets 4, secured to the under side of the car-platform. Connected to the supporting-arms 1, near their forward ends, are diagonal or oblique braces 5, which at their rear ends are provided with depending pins or hooks 6, which engage socket-pieces 7, secured to the front end of the dashboard at each side thereof, as shown. The supporting-frame constructed as above noted is thus detachably supported on the end of the car and effectively braced when in its supported position.

8 designates the scoop-frame, which in plan view is substantially rectangular, and comprises the side bars 9 and the front and rear cross-bars 10, over which is stretched meshed fabric 11, of wire or rope. The side bars 9 are elbow-shaped, so as to form a concaved surface to the upper side of the scoop. To the scoop-frame on each side is secured a hinge-bar 12, which works pivotally on one of the supporting-bars 1, as indicated at 13, preferably by means of a knuckle-joint. The bars 1 are extended in advance of the joint 13, so as to afford abutting surfaces or rests 14, which coöperate with the bars 12 to limit the downward movement of the front ends of the scoop-frame and prevent the same coming into contact with the road-bed in picking up an object or person.

The rear end of the scoop-frame is normally upheld and the forward end depressed by means of a pair of springs 15, one of which is secured to each side bar 1 and provided with one or more coils 16 and an arm 17, which extends along the under side of the rear portion of one of the side bars 9 of the scoop-frame, to which it is secured. When an object falls upon the scoop-frame, its springs yield to allow the rear end of the scoop-frame to fall, and when said end reaches its lowermost position it is engaged and held down by means of a spring-actuated catch-bolt 18, mounted slidingly in the cross-bar 2, above referred to, and provided with a knob 19, by means of which said catch-bolt may be operated for releasing the scoop. The forward cross-bar of the scoop is provided with a suitable keeper 20 for engagement with the said catch-bolt. When in this position, the forward end of the scoop-frame is held a considerable distance above the road-bed.

21 designates the rear portion of the fender, which is in the form of a substantially rectangular upright frame comprising the standards 22, pivotally connected at their lower ends to the side supporting-bars 1 and connected at their upper ends by a cross bar or rail 23, having a hand-grip 24 near its center by means of which the motorman may lift the front end of the scoop for passing over an obstruction. This upright frame is covered with meshed fabric 25 and is connected to the forward end of the scoop-frame by means of braces 26 at each side of the fender, said braces connecting pivotally at their rear ends to said upright frame 21 and at their forward ends to the corresponding end of the scoop-frame. Between the braces 26 of the lower forward portion of the scoop-frame and the supporting-bars 1 are interposed flexible guards 26, of meshed fabric, said fabric being also connected at the rear of the standards 22 to the back frame or stop.

By this arrangement as the rear ends of the scoop-frame are depressed the upright frame 21 is thrown backward and forms a yielding stop or cushion for the object received in the fender. At the front end of the scoop-frame is a roller 28, which, if desired, may be covered by rubber and which prevents injury to a person picked up by the fender and which also is adapted to prevent injury to the fender by contacting with or rolling upon the road-bed while other parts of the fender are upheld therefrom.

The car-fender above described may be manufactured at a reasonable cost and will be found reliable and effective in operation.

Instead of placing the fender in front of the dashboard the said fender may be made somewhat smaller or less in height and placed beneath the platform of the car, the right being reserved to locate said fender in either of the positions referred to. If desired, a lever 29 may be fulcrumed on the frame which supports the scoop, said lever being in engagement with the catch-bolt 18 for moving the latter so as to release the scoop and also extending laterally toward one side of the car for facilitating its manipulation. After the scoop-frame has been thrown back and caught by said bolt the lever 29 may be vibrated so as to release the scoop and lower the same to be again folded downward into its operative position.

Having thus described the invention, what is claimed as new, and desired to be secured by Letters Patent, is—

1. In a car-fender, the combination with a supporting-frame having provision whereby it may be detachably connected to a car, of a scoop-frame pivotally mounted intermediate its ends on said supporting-frame and adapted to tilt under the weight of the object received therein, and a spring-actuated bolt arranged to engage the rear end of said scoop-frame for holding the latter in its folded position, substantially as described.

2. In a car-fender, the combination with a supporting-frame adapted to be detachably connected to a car, of a scoop-frame fulcrumed intermediate its front and rear ends on said supporting-frame and adapted to tilt backward on receiving an object, a catch for automatically engaging directly with and holding the rear end of the scoop-frame when tilted, and a lever for releasing said catch, substantially as described.

3. In a car-fender, the combination with a supporting-frame adapted to be detachably connected to a car, of a scoop-frame fulcrumed intermediate its ends on said supporting-frame, an upright back frame or stop pivotally connected to said supporting-frame, and rigid braces forming inflexible guards between the said upright frame and the scoop-frame whereby both are influenced by the weight of the object received in the fender, substantially as described.

4. In a car-fender, the combination with a supporting-frame, of a scoop-frame fulcrumed intermediate its ends on said supporting-frame, an upright back frame or stop pivotally connected to said supporting-frame, inflexible diagonal braces connecting said upright frame with the front end of the scoop-frame and forming non-collapsible side guards, means for holding the front end of the scoop-frame depressed, and means for automatically engaging and holding the rear end of the scoop-frame depressed, substantially as described.

5. In a car-fender, a supporting-frame adapted to be detachably connected to a car, and comprising spaced and substantially parallel arms extending in advance of the car, in combination with a scoop-frame fulcrumed intermediate its ends between said arms, corresponding stops on said supporting-arms and scoop-frame for limiting the downward movement of the front end of the scoop and holding the same depressed, a pivoted back-stop and inflexible oblique braces connecting said back-stop and scoop and forming rigid side guards, substantially as described.

In testimony whereof I have signed this specification in the presence of two subscribing witnesses.

JOHN WICK.

Witnesses:
MATTHEW SCANLAN,
THOMAS SMITH.